United States Patent
Yamane et al.

(10) Patent No.: US 7,783,415 B2
(45) Date of Patent: Aug. 24, 2010

(54) TRAFFIC INFORMATION PROCESSING APPARATUS

(75) Inventors: Kenichiro Yamane, Hitachi (JP); Mariko Okude, Hitachi (JP); Masatoshi Kumagai, Hitachi (JP)

(73) Assignee: Xanavi Informatics Corporation, Zama-shi (JP)

( * ) Notice: Subject to any disclaimer, the term of this patent is extended or adjusted under 35 U.S.C. 154(b) by 708 days.

(21) Appl. No.: 11/649,165

(22) Filed: Jan. 4, 2007

(65) Prior Publication Data

US 2007/0185643 A1  Aug. 9, 2007

(30) Foreign Application Priority Data

Jan. 6, 2006  (JP)  ............... 2006-001660

(51) Int. Cl.
 *G06F 19/00*  (2006.01)
(52) U.S. Cl.  .................. 701/117; 701/208; 340/995.13
(58) Field of Classification Search  ................  701/117, 701/208; 340/995.13
 See application file for complete search history.

(56) References Cited

U.S. PATENT DOCUMENTS

| | | | |
|---|---|---|---|
| 6,178,374 B1 * | 1/2001 | Mohlenkamp et al. | ...... 701/117 |
| 2002/0026278 A1 | 2/2002 | Feldman et al. | |
| 2005/0096839 A1 * | 5/2005 | Nakano et al. | ............... 701/200 |
| 2005/0206534 A1 * | 9/2005 | Yamane et al. | ............... 340/994 |

FOREIGN PATENT DOCUMENTS

| | | |
|---|---|---|
| EP | 1 724 738 A1 | 11/2006 |
| JP | 2002-372430 A | 12/2002 |

OTHER PUBLICATIONS

Extended European Search Report issued in EP 07 00 0117 on Dec. 15, 2009.

* cited by examiner

*Primary Examiner*—Mark Hellner
*Assistant Examiner*—Helal A Algahaim
(74) *Attorney, Agent, or Firm*—Crowell & Moring LLP

(57) ABSTRACT

A traffic information processing apparatus for alleviating the problem of discrepancy between a plurality of traffic information which may be acquired from different sources is disclosed. In the case where a plurality of traffic information are acquired, the information are corrected into reference traffic information selected from the plurality of the traffic information. For example, the traffic information processing apparatus acquires first traffic information (VICS information) used for the navigation process and second traffic information (probe traffic information) having a different source from the first traffic information. From the first and second traffic information, the traffic information for a common object is extracted, and based on the difference between them, the correcting information used for correcting the second traffic information is generated. The traffic information on an object not contained in the first traffic information is acquired by correcting the second traffic information on the object using the correcting information.

6 Claims, 12 Drawing Sheets

FIG.7

- TEACHER DATA (VICS TRAFFIC INFORMATION) — 410
  - MESH ID — 411
  - LINK ID — 412
  - DATA REGISTRATION DATE/HOUR — 413
  - LINK TRAVEL TIME — 414
- OBJECT DATA (PROBE TRAFFIC INFORMATION) — 420
  - MESH ID — 421
  - LINK ID — 422
  - DATA REGISTRATION DATE/HOUR — 423
  - LINK TRAVEL TIME — 424

FIG.8

CORRECTION COEFFICIENT INFORMATION — 530

- MESH ID — 501
- DATA PREPARATION DATE/HOUR — 502
- DAY TYPE — 503
- DATE/HOUR CONCERNED — 504
- LINK-WISE CORRECTION COEFFICIENT — 505
  - LINK ID — 506
  - CORRECTION COEFFICIENT — 507
- ROAD-TYPE-WISE CORRECTION COEFFICIENT — 508
  - ROAD TYPE — 509
  - CORRECTION COEFFICIENT — 510
- TOTAL LINK CORRECTION COEFFICIENT — 511

TRAFFIC INFORMATION PROCESSING APPARATUS

INCORPORATION BY REFERENCE

The present application claims priority from Japanese application JP 2006-001660 filed on Jan. 6, 2006, the content of which is hereby incorporated by reference into this application.

BACKGROUND OF THE INVENTION

This invention relates to a traffic information processing apparatus used for navigation.

A system is available to distribute traffic information to in-vehicle navigation systems. On the other hand, an in-vehicle navigation system is available to search for the route shortest in travel time using the traffic information received (JP-A-2002-372430).

In the presence of a plurality of traffic information from different sources, the simultaneous use of the plurality of the traffic information as they are by the navigation system may lead to an inconvenience. Consider an exemplary case in which a sensor (vehicle detector) installed on a road collects traffic information (referred to as "the installed sensor-originated traffic information) on the one hand and a vehicle actually running on a road collects traffic information (referred to as "the probe car-originated traffic information) on the other hand. The installed sensor-originated traffic information contains the traffic information around the clock. These traffic information, however, are limited to those on the road on which the particular sensor is installed. Since the sizes of vehicles are not uniform, a detection error makes the installed sensor-originated traffic information not always accurate. The probe car-originated traffic information, on the other hand, not only may contain the information on the roads not installed with the sensor, but reflects the propensities of each driver and therefore may not always be an average one. The information in the name of "traffic information", therefore, have various features. A plurality of traffic information for the same time zone on the same road may be discrepant to some degree. The use of the plurality of discrepant traffic information as they are may pose the problem described below.

Assume that, as shown in FIG. 16, only the installed sensor-originated traffic information (such as derived from VICS (vehicle information and communication system)) are available for links A, B, C, while only the probe car-originated traffic information can be used for links D, E, F. Also assume that the probe car-originated traffic information tends to be shorter in link travel time and that the route shortest in travel time is searched for using the link travel time of the two traffic information as they are. Then, a route Y including a detour passing through the links D, E, F, instead of a route X straight along a road, may be retrieved. Frequent sessions of this search may result in the retrieval of a route having many curves.

SUMMARY OF THE INVENTION

The object of this invention is to alleviate the problem of discrepancy of a plurality of traffic information which may be available from different sources.

Specifically, according to the invention, a plurality of traffic information having different sources, if any, are corrected by setting one of the traffic information as a reference and converging the remaining traffic information to the particular reference traffic information.

According to a first aspect of the invention, there is provided a traffic information processing apparatus comprising:

a means for acquiring first traffic information used for the navigation process and second traffic information originated from a source different with the first traffic information;

a correcting information generating means for extracting the traffic information on a common object from the first traffic information and the second traffic information and generating the correcting information used to correct the second traffic information based on the difference between the two traffic information extracted; and a traffic information correcting means for acquiring the traffic information on an object not contained in the first traffic information, by correcting the second traffic information on the object using the correcting information.

According to a second aspect of the invention, there is provided a traffic information processing apparatus comprising:

a means for acquiring first traffic information used for the navigation process and second traffic information originated from a source different with the first traffic information;

a correcting information acquisition means for acquiring the correcting information used to correct the difference of the second traffic information with the first traffic information and to approximate the second traffic information to the value of the first traffic information; and a traffic information correcting means for acquiring the traffic information on an object not contained in the first traffic information, by correcting the second traffic information on the object using the correcting information.

According to a third aspect of the invention, there is provided a traffic information processing apparatus comprising:

a means for acquiring first traffic information used for the navigation process and second traffic information originated from a source different with the first traffic information;

a correcting information acquisition means for acquiring the correcting information used to correct the difference of the second traffic information with the first traffic information and to approximate the second traffic information to the value of the first traffic information;

an object setting means for setting an object requiring correction; and a traffic information correcting means for extracting, from the second traffic information, the traffic information on the object set by the object setting means and correcting the extracted traffic information using the correcting information.

BRIEF DESCRIPTION OF THE DRAWINGS

FIG. 7 is a diagram showing an example of the structure of a teacher data and an object data.

FIG. 8 is a diagram showing an example of the structure of the correction coefficient information.

DETAILED DESCRIPTION OF THE INVENTION

An embodiment of the invention is explained below with reference to the drawings.

Figure 1:
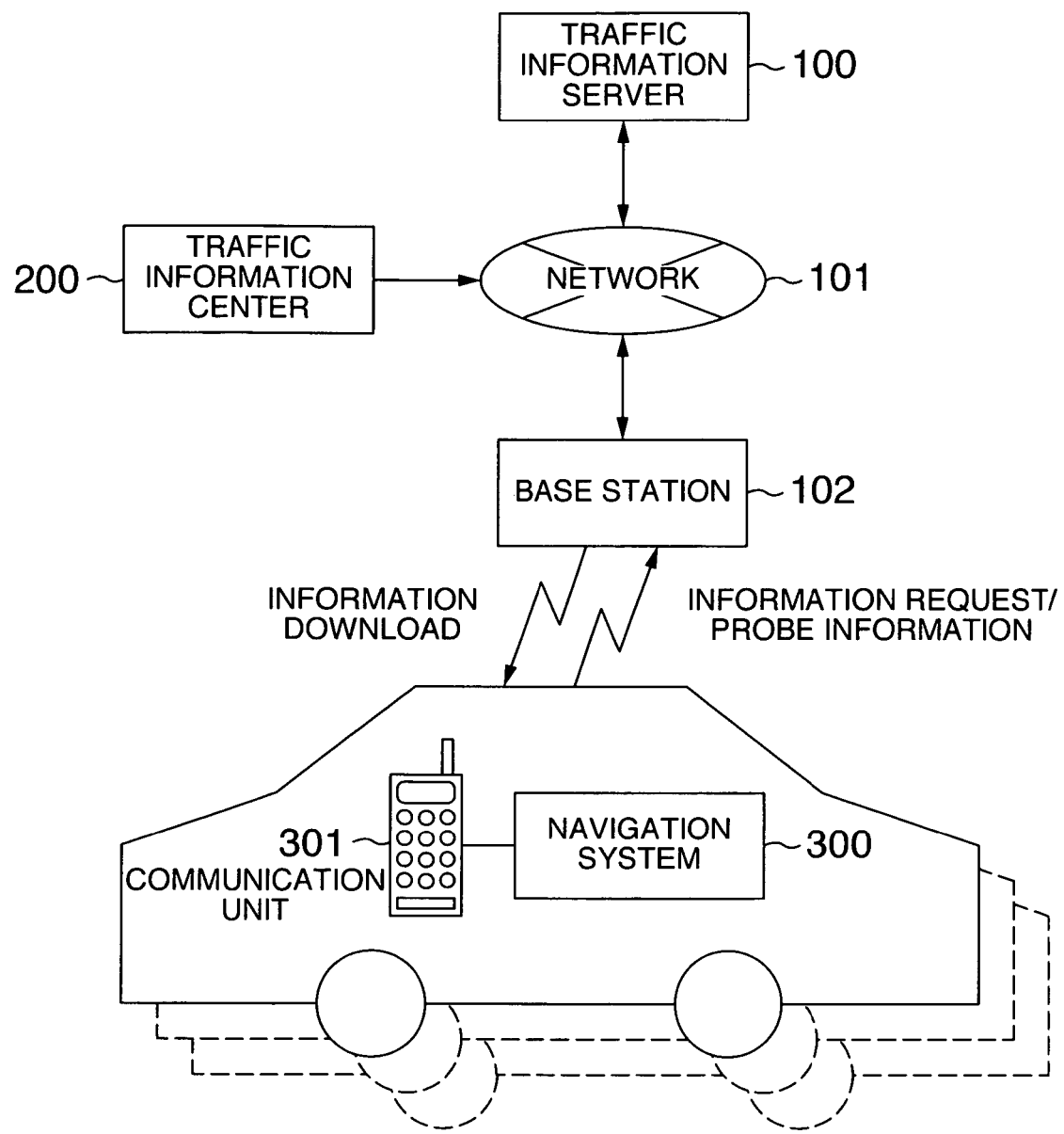
FIG. 1 is a diagram showing a general configuration of a navigation system according to an embodiment of the invention.

FIG. 1 is a diagram showing a general configuration of a navigation system according to an embodiment of the invention. As shown in FIG. 1, the navigation system according to this embodiment includes a traffic information distribution server 100 and an in-vehicle navigation system 300. The in-vehicle navigation system 300 executes the navigation process using the traffic information received from a traffic information center 200 and the traffic information distribution server 100. The in-vehicle navigation system 300 may collect the probe traffic information from the speed of the vehicle on which it is mounted. Also, the in-vehicle navigation system 300 may transmit the collected probe traffic information to the traffic information distribution server 100. In the process, the vehicle functions as a probe car.

The in-vehicle navigation system 300 can be connected with a communication unit 301 such as a mobile phone. The in-vehicle navigation system 300 is connected to a radio base station 102 of the traffic information distribution server 100 through the communication unit 301 and further connected to the traffic information distribution server 100 through a network 101.

The traffic information supplied by the traffic information center 200 is sent to the traffic information distribution server 100. Also, the traffic information of the traffic information center 200 can be transmitted to the in-vehicle navigation system 300 by a FM multiplex broadcast station (not shown) or a beacon (not shown). The traffic information center 200 transmits the VICS information provided by, for example, the Road Traffic Information Communication System Center (VICS Center).

The traffic information distribution server 100 is configured of the existing computer system including an arithmetic unit (CPU), a memory and a communication interface.

Figure 2:
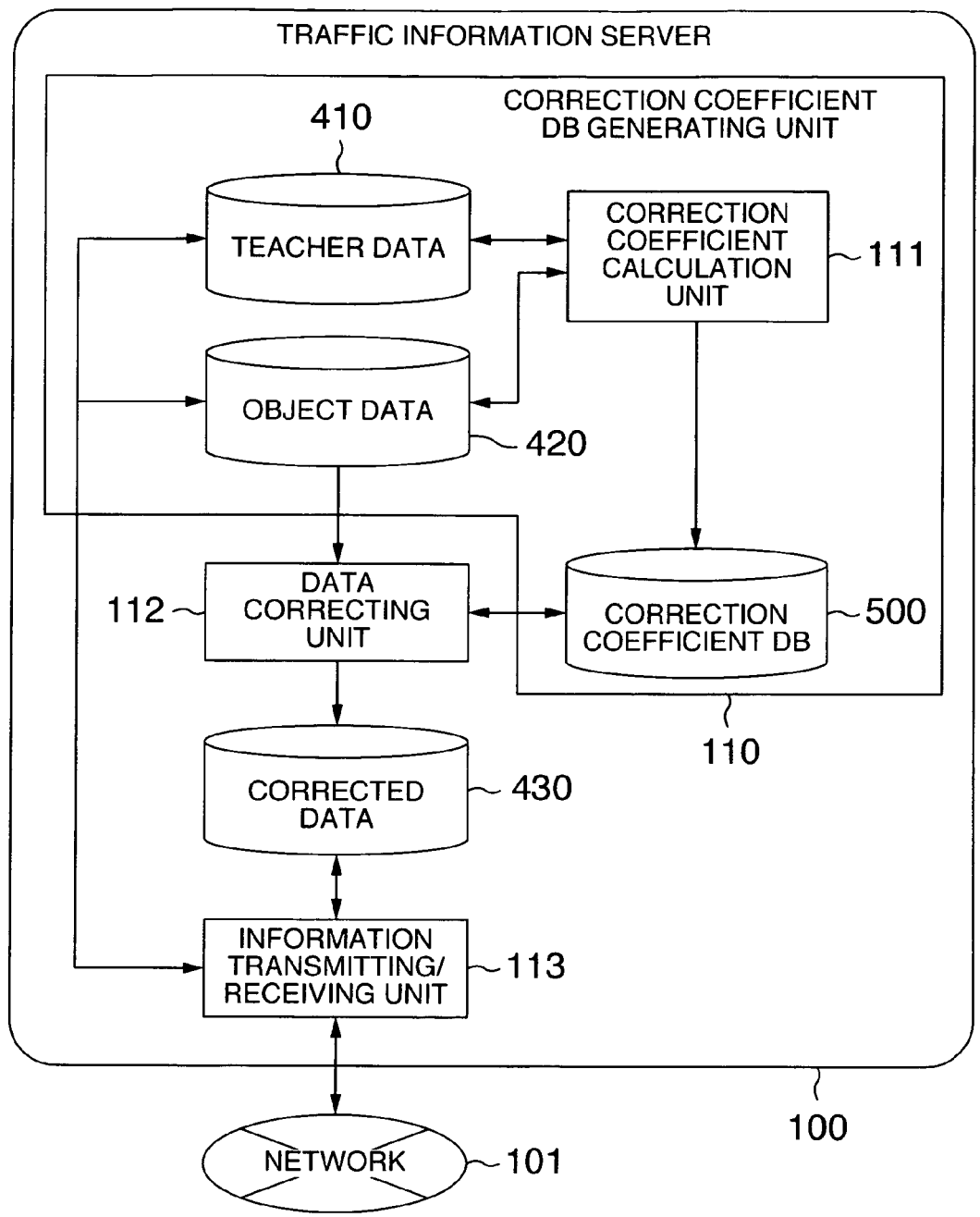
FIG. 2 is a diagram showing a general configuration of a traffic information distribution server.

FIG. 2 is a functional block diagram of the traffic information distribution server 100.

The traffic information distribution server 100 includes a correction coefficient data base (DB) generating unit 110, a data correcting unit 112 and an information transmitting/receiving unit 113.

The correction coefficient DB generating unit 110 includes a correction coefficient calculation unit 111. The correction coefficient calculation unit 111 determines the correction coefficient for correcting the object data 420 using the teacher data 410 providing the traffic data received from the traffic information center 200 and the object data 420 providing the traffic information collected by the probe car, and stores the correction coefficient in the correction coefficient DB 500.

The data correcting unit 112 executes the process of correcting the object data 420 using the correction coefficient of the correction coefficient DB 500 and generates the corrected data 430.

The information transmitting/receiving unit 113 executes the process as an intermediary for transmitting and receiving the information to and from the traffic information center 200 and the in-vehicle navigation system 300. Specifically, the information transmitting/receiving unit 113 receives the traffic information from the traffic information center 200 and stores them as the teacher data 410. Also, the unit 113 receives the probe information collected by the in-vehicle navigation system 300 and stores them as object data 420. Further, from the teacher data 410, the object data 420 and the corrected data 430, the unit 113 extracts and transmits the traffic information requested by the in-vehicle navigation system 300.

The traffic information distribution server 100 holds the map data in the storage unit thereof. The map data contains the link data of each link making up the roads included in a mesh area defined on the map for each ID code (mesh ID). The link data, for each link ID, contains the coordinate information of two nodes (start node and end node) making up a link, the information on the type of the road including the link, the link length information indicating the link length and the link ID (connection link ID) of each link connected to the two nodes.

Figure 3:
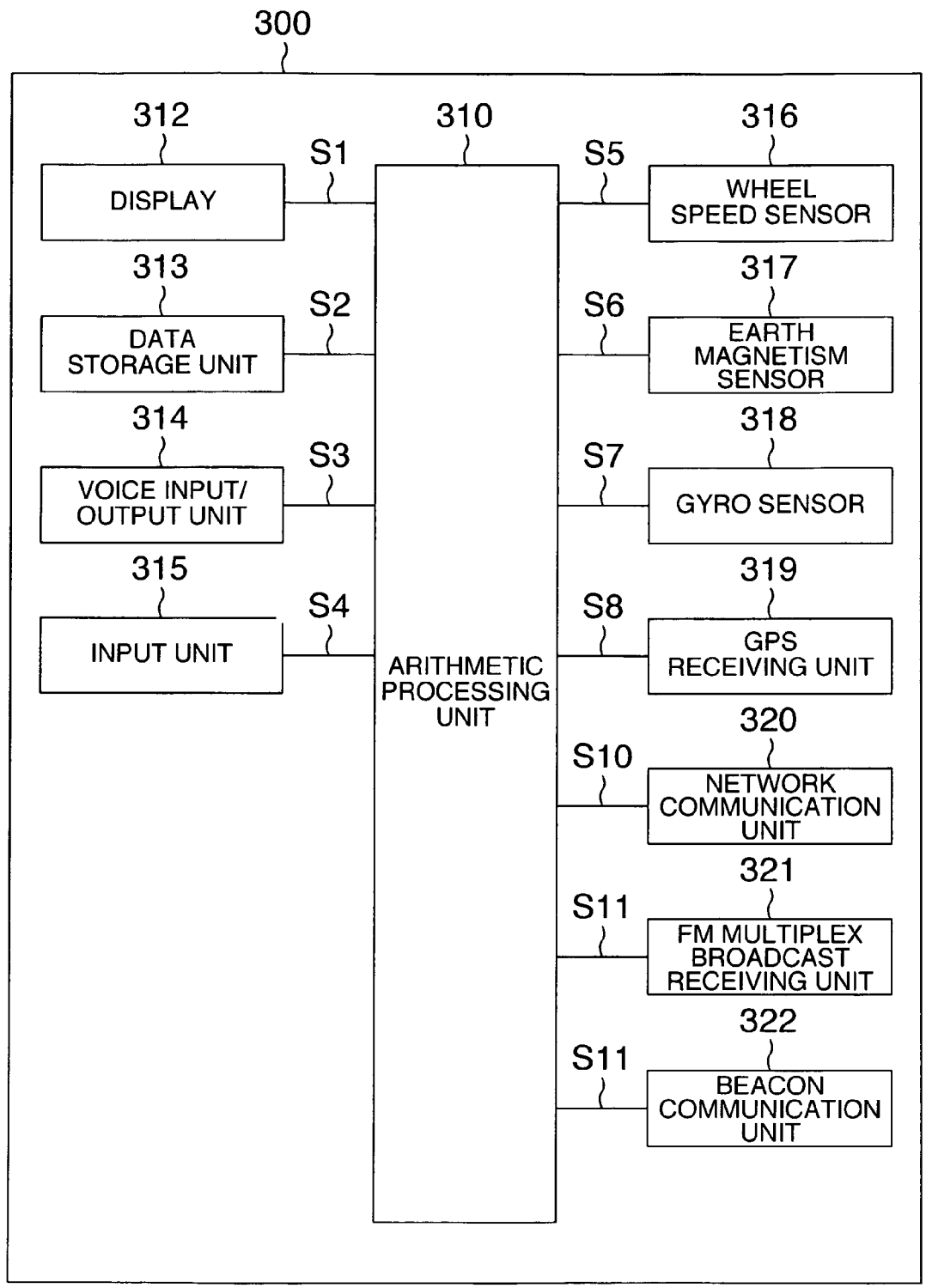
FIG. 3 is a diagram showing a general configuration of an in-vehicle navigation system.

FIG. 3 is a diagram showing a general configuration of the in-vehicle navigation system 100. As shown in FIG. 3, the in-vehicle navigation system 300 includes an arithmetic processing unit 310, a display unit 312, a data storage unit 313, a voice input/output unit 314, an input unit 315, a vehicle wheel speed sensor 316, an earth magnetism sensor 317, a gyro sensor 318, a GPS (global positioning system) receiving unit 319, a network communication unit 320, a FM multiplex broadcast receiving unit 321 and a beacon receiving unit 322.

The arithmetic processing unit 310 is a central unit for executing various processes including the process of detecting the present position based on the information output from the various sensors 316 to 318 and the GPS receiving unit 319, the process of reading the map data required for display from the data storage unit 313 based on the present position information acquired, the process of developing the read map data graphically and displaying it on the display unit 312 with the mark indicating the present position superposed thereon, the process of searching for the optimum route (recommended route) connecting the destination designated by the user and the present position (starting point), using the map data stored in the data storage unit 313 and the traffic information received from the traffic information distribution server 100, etc. and the process of guiding the user by the voice input/output unit 314 and the display unit 312.

The display unit 312 displays the graphics information generated by the arithmetic processing unit 310. The display unit 312 is configured of a CRT or a liquid crystal display.

The data storage unit 313 is configured of a storage medium such as a CD-ROM, a DVD-ROM, a HDD or an IC card. This storage medium has stored therein the map data which contains the link data of each link included in the mesh area for each mesh ID. The link data contains, for each link ID, the coordinate information of two nodes (start and end nodes) making up a link, the information on the type of the road including the link, the link length information indicating the link length and the link ID (connection link ID) of each link connected to the two nodes.

The voice input/output unit 314 outputs by converting a message generated in the arithmetic processing unit 1 and addressed to the user into a voice signal. Also, the voice input/output unit 314 executes the process of recognizing the voice of the user and transferring the contents thereof to the arithmetic processing unit 310.

The input unit 315 receives an instruction from the user. The input unit 315 is configured of hard switches such as a scroll key and a scale change key, a joystick and a touch panel attached on the display.

The sensors 316 to 318 and the GPS receiving unit 319 are used for detecting the present position (own vehicle position) by the in-vehicle navigation system 300. The vehicle wheel speed sensor 316 measures the distance from the product of the circumference of the wheel and the r.p.m. of the wheel and further measures the angle by which the mobile unit is turned based on the difference of r.p.m. between the wheels in pair. The earth magnetism sensor 317 detects the earth magnetism held by the earth and detects the direction which the mobile unit faces. The gyro sensor 318, configured of an optical fiber gyro or a vibration gyro, detects the angle by which the mobile unit is turned. The GPS receiving unit 319 receives the signals from GPS satellites, and measures the present position, the processing speed and the processing direction of the mobile unit by measuring the distance and the change rate of the distance between the mobile unit and three or more GPS satellites.

The network communication unit 320 acts as an intermediary for transmitting and receiving the information to and form the in-vehicle navigation system 100 and the traffic information distribution server 203 through the communication unit 301 such as a mobile phone.

The FM multiplex broadcast receiving unit 321 receives the traffic information as a FM multiplex broadcast signal sent from the FM multiplex broadcast station.

The beacon receiving unit 322 receives the traffic information sent from the beacon.

Figure 4:
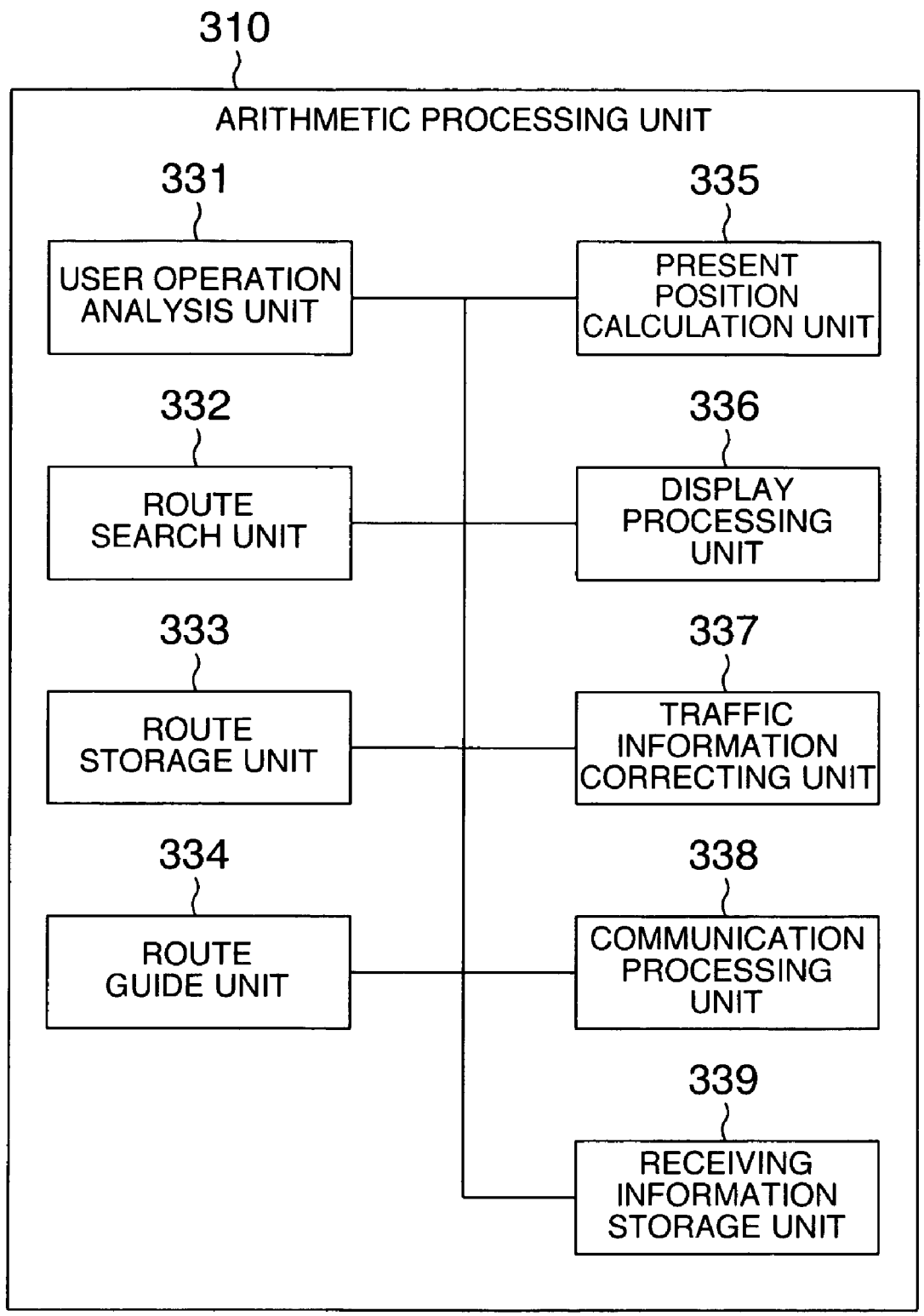
FIG. 4 is a diagram showing the functional configuration of an arithmetic processing unit 310 of the in-vehicle navigation system.

FIG. 4 is a diagram showing the functional configuration of the arithmetic processing unit 1.

As shown in FIG. 4, the arithmetic processing unit 310 includes a user operation analysis unit 331, a route search unit 332, a route storage unit 333, a route guide unit 334, a present position calculation unit 335, a display processing unit 336, a traffic information correcting unit 337, a communication processing unit 338 and a receiving information storage unit 339.

The user operation analysis unit 331, upon receipt of a user request input from the input unit 315, analyzes the request and controls each part of the arithmetic processing unit 310 to execute the process corresponding to the contents of the particular request. In the case where the user requests the search for a recommended route, for example, the request to display the map on the display unit 312 is given to the display processing unit 336 to set the destination. Also, the request is given to the display processing unit 336 to display the traffic information received.

In the present position calculation unit 335, the distance data and the angular data, obtained by integrating the distance pulse data S5 measured by the vehicle wheel speed sensor 316 and the angular acceleration data S7 measured by the gyro 8, are integrated along time axis thereby to periodically calculate the present position (X', Y') covered by the vehicle from the initial position (X, Y). Also, using the result of this calculation, the present position is converged to a road (link) having the highest geometric correlationship by the map matching process. Further, the present position is corrected periodically by the output of the GPS receiving unit 319.

The route search unit 332 searches for a route connecting two designated points (present position and destination) having the minimum total cost (in terms of travel time, for example) using the Dijkstra method or the like. The route search uses the link travel time contained in the traffic information received. Also, a route is retrieved avoiding the roads high in congestion level.

The route storage unit 333 stores the route retrieved by the route search unit 332.

The route guide unit 334 guides the mobile unit along the route retrieved by the route search unit 332.

The display processing unit 336 receives, from the data storage unit 313, the map data in the area of which the display on the display unit 312 is requested, and generates a map drawing command to draw the marks of the roads and other component elements of the map and arrows indicating the present position, the destination and the intended route by the scale and the drawing method designated. The command thus generated is transmitted to the display unit 312.

The traffic information correcting unit 337 corrects the traffic information using the correction coefficient received from the traffic information distribution server 100. In the case where the corrected traffic information is received from the traffic information distribution server 100, the process of correcting the traffic information can be omitted.

The communication processing unit 338, upon receipt of a traffic information download request, is connected to the traffic information distribution server 100 through the network communication unit 320 to request the downloading of the traffic information. The traffic information thus downloaded is stored in the receiving information storage unit 339 by the communication processing unit 338. Also, the communication processing unit 338 causes the traffic information received from the FM multiplex broadcast station or the beacon to be stored in the receiving information storage unit 339. In the case where the data storage unit 313 is configured of a rewritable HDD or a flash ROM, the communication processing unit 338. can alternatively store the received information in the storage unit 313.

Figure 5:
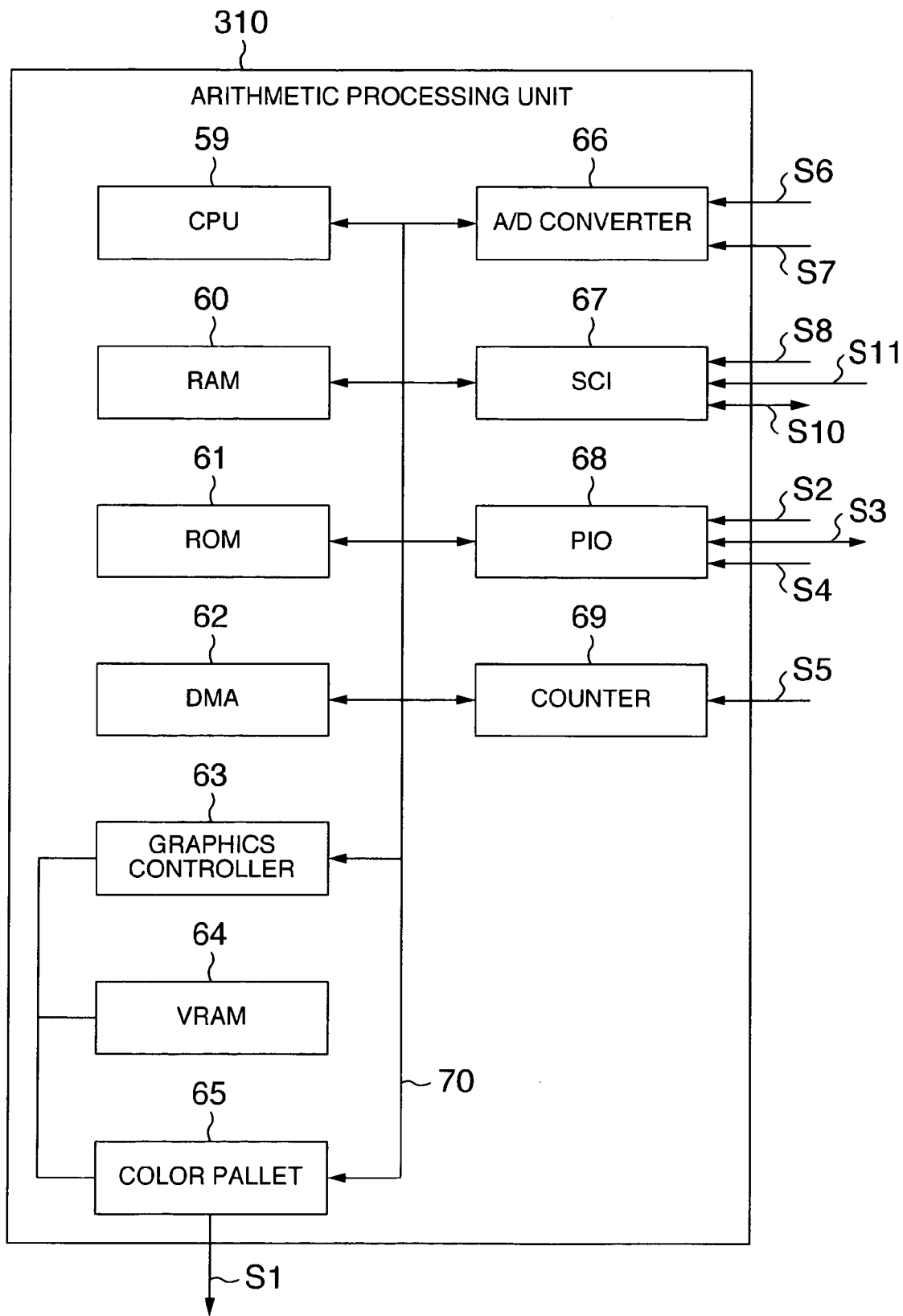
FIG. 5 is a diagram showing a hardware configuration of the arithmetic processing unit 310 of the in-vehicle navigation system.

FIG. 5 is a diagram showing an example of the hardware configuration of the arithmetic processing unit 310.

As shown in FIG. 5, the arithmetic processing unit 310 include various deices interconnected by a bus 70. Specifically, the arithmetic processing unit 310 includes a CPU (central processing unit) 59 for executing various processes such as the numerical operation and the device control operation, a RAM (random access memory) 60 for storing the map data and the arithmetic data read from the data storage unit 313, a ROM (read-only memory) 61 for storing the programs and data, a DMA (direct memory access) 62 for transferring the data between the memories or between each memory and the devices, a graphics controller 63 for executing the graphic drawing and display control, a VRAM (video random access memory) 64 for storing the graphic image data, a color pallet 65 for converting the image data into the RGB signals, an A/D converter 66 for converting the analog signal into the digital signal, a SCI (serial communication interface) 67 for converting the serial signal into the parallel signal synchronized with the bus, a PIO (parallel input/output) 68 for synchronizing the parallel signals with and placing them on the bus, and a counter 69 for integrating the pulse signals.

(Operation)

Next, the operation of the navigation system having the aforementioned configuration is explained.

First, the process executed by the traffic information distribution server 100 is explained. The traffic information distribution server 100 calculates the correction coefficient for correcting and converging the object data 420 to the teacher data 410.

Figure 6:
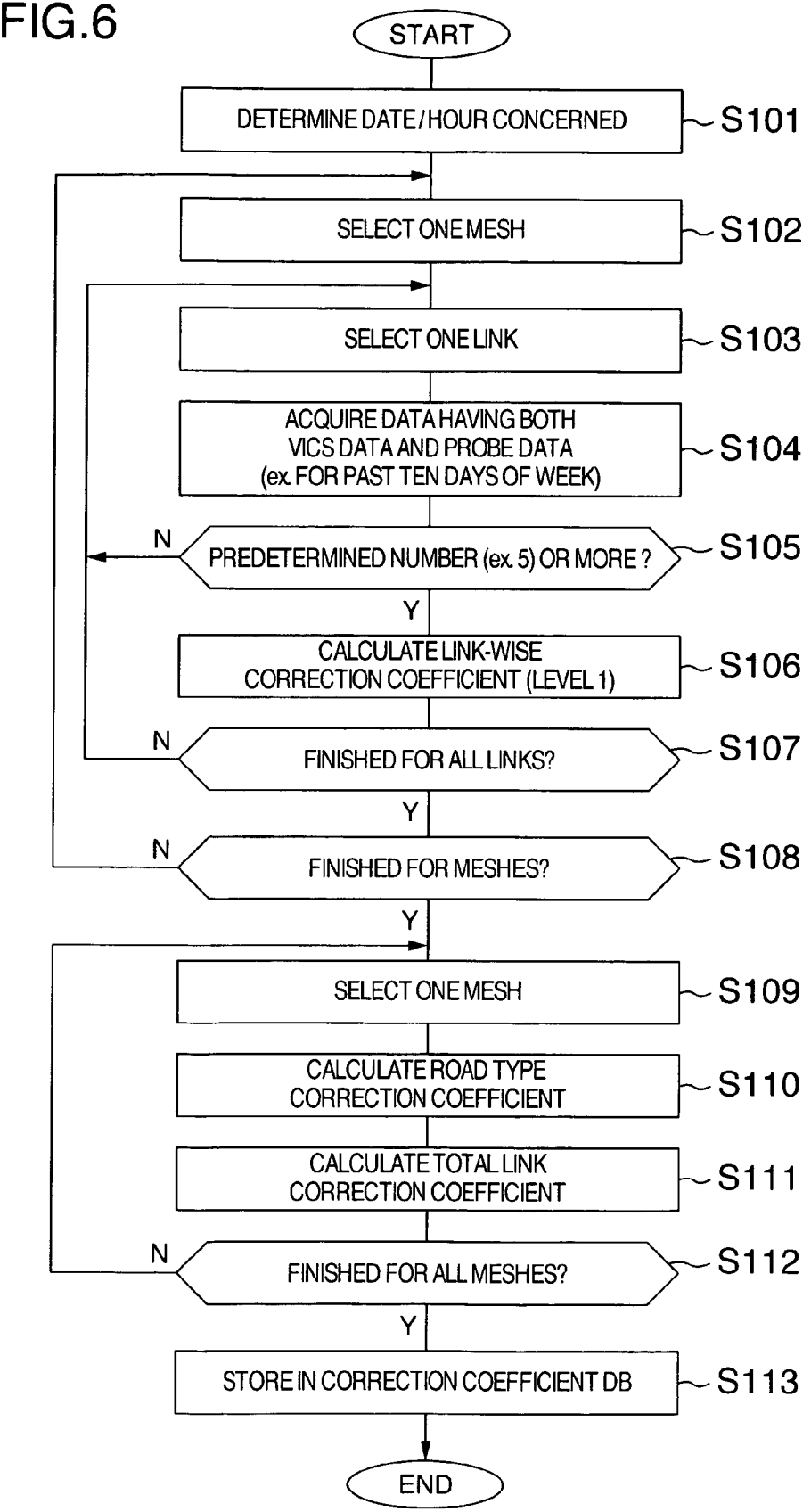
FIG. 6 is a flowchart showing the process of generating a correction coefficient.

FIG. 6 is a flowchart showing the flow of the correction coefficient calculation process executed by the correction coefficient calculation unit 111 of the traffic information distribution server 100.

As shown in FIG. 7, assume that the traffic information (VICS information in the case under consideration) received from the traffic information center 200 is stored as the teacher data 410 on the one hand and the probe traffic information 420 collected by the probe car are stored as the object data 420 on the other hand. As shown in FIG. 7, the teacher data 410 contains the data registration date/hour (data collection date/hour) 413 and the link travel time 414 for each mesh ID 411 and each link ID 412. Also, the object data 420 contains the data registration date/hour (data collection date/hour) 423 and the link travel time 424 for each mesh ID 421 and each link ID 422.

First, the correction coefficient calculation unit 111 sets the date/hour at which the correction coefficient is determined, i.e. the date/hour of the traffic information for which the correction coefficient is used (referred to as "the date/hour concerned") (S101). Specifically, the type of the date (weekday or holiday) and the time zone (13:00 to 14:00, for example) are set. For example, "the type of day" is determined as "today" and "the time zone" one hour after the present time are set as the date/hour concerned. The correction coefficient calculation unit 111 holds a table for converting the "date" into "the type of day" (weekday or holiday). The correction coefficient calculation unit 111 converts the "date" into "the type of day" in the data registration date/hour 413 of the teacher data 410 and the registration date/hour 423 of the object data 420 using the table also in the steps described later.

Next, the correction coefficient calculation unit 111 selects one of the mesh IDs from the map data (S102).

Further, the correction coefficient calculation unit 111 selects one of the link IDs of the links in the mesh of the mesh ID selected (S103).

Next, the correction coefficient calculation unit 111 determines whether both the teacher data 410 and the object data 420 exist at the date/hour concerned, set in step S101, of the link selected in step S103. This process uses the data for a predetermined number of days (for the past ten days, for example) instead of comparing all the data. It is then determined whether both the teacher data 410 and the object data 420 exist in the same time zone (every five minutes, for example) (S104).

Specifically, the teacher data 410 is extracted in which the mesh ID 411 is the one selected in step S102, the link ID 412 is the one selected in step S103 and the data registration date/hour 413 is the date/hour set in step S101. In similar fashion, the object data 420 is extracted in which the mesh ID 421 is the one selected in step S102, the link ID 422 is the one selected in step S103 and the data registration date/hour 423 is the one set in step S101. Then, the time zone of every five minutes, for example, is set, and it is determined whether the data in the particular time zone is contained in both the data extracted from the teacher data 410 and the data extracted from the object data 420. In the case where the data are so contained, the particular data are held. In this way, the data for the time zone set in step S101 are checked in each predetermined time zone (every five minutes).

Next, the correction coefficient calculation unit 111 determines whether both the teacher data 410 and the object data 420 exist in at least a predetermined number (say, five) of time zones (S105). In the case where this number of time zones is less than the predetermined number (NO in step S105), the process is returned to step S107 and continued. In the case where the number of time zones in which both the data exist is not less than the predetermined number (YES in step S105), on the other hand, the correction coefficient calculation unit 111 calculates a link-wise correction coefficient (level 1) (S106).

The correction coefficient is ranked in levels 1 to 3 which are called the link-wise correction coefficient, the road-type-wise correction coefficient and the total link correction coefficient (mesh-wise correction coefficient), respectively.

The link-wise correction coefficient is determined by, for example, the correction coefficient calculation formula shown below.

<Correction Coefficient Calculation Formula>

Correction formula: $T_{comp} = a \cdot T_{obj} + b$

The correction coefficients a, b are determined by regression analysis from the equation below, where $T_{obj}$ is the object data, $T_{true}$ the teacher data, and n the number of data.

$$a = \frac{n \sum_t T_{obj}(i) T_{true}(i) - \sum_t T_{obj}(i) \sum_t T_{true}(i)}{n \sum_t T_{obj}(i)^2 - \left(\sum_t T_{obj}(i)\right)^2}$$

$$b = \frac{n \sum_t T_{obj}(i)^2 \sum_t T_{true}(i) - \sum_t T_{obj}(i) T_{true}(i) \sum_t T_{obj}(i)}{n \sum_t T_{obj}(i)^2 - \left(\sum_t T_{obj}(i)\right)^2}$$

The correction coefficient calculation unit 111 executes the process of steps S103 to S106 for all the links in the mesh selected in step S102 (S107).

The correction coefficient calculation unit 111 also executes the process of steps S102 to S107 for all the meshes on the map (S108).

In this way, the link-wise correction efficient (level 1) at the date/hour concerned (for example, "13:00 to 14:00" of a "week day") is calculated for each link (YES in step S108).

Next, the correction coefficient calculation unit 111 selects one of the meshes (S109)

Then, the correction coefficient calculation unit 111 calculates the road-type-wise correction coefficient (level 2) (S110). Specifically, the link-wise correction coefficients determined in step S106 for the links in the selected mesh are collected by road type. For example, the road type associated with each link is determined from the map data, and the link-wise correction coefficients are classified according to the road type. Then, the average value of the link-wise correction coefficients is determined for each road type.

Next, the correction coefficient calculation unit 111 determines the total link correction coefficient (level 3) (S111). Specifically, the average value of the link-wise correction coefficients determined in step S106 for the links in the selected mesh is calculated as the total link correction coefficient.

The correction coefficient calculation unit 111 executes the process of steps S109 to S111 for all the meshes on the map (S112). In this way, the road-type-wise correction coefficient (level 3) and the total link correction coefficient (level 4) are determined for each mesh.

The correction coefficient calculation unit 111 stores the correction coefficients thus determined, in the correction coefficient DB 500 as the correction coefficient information 530 (S113).

FIG. 8 is a diagram showing the structure of the correction coefficient information 530. The correction coefficient information 530 contains, for each mesh ID 501, the data preparation date/hour 502, the date type 503 set in step S101, the date/hour concerned 504 set also in step S101, the link-wise correction coefficient 505, the road-type-wise correction coefficient 508 and the total link correction coefficient 511. The link-wise correction coefficient 505 contains the correction coefficient for each link ID 506. The road-type-wise correction coefficient 508 contains the correction coefficient 510 for each road type 509.

The process executed by the correction coefficient calculation unit 111 to calculate the correction coefficient is explained above.

Next, the process of generating the corrected data by correcting the object data 420 using the correction coefficient is explained.

Figure 9:
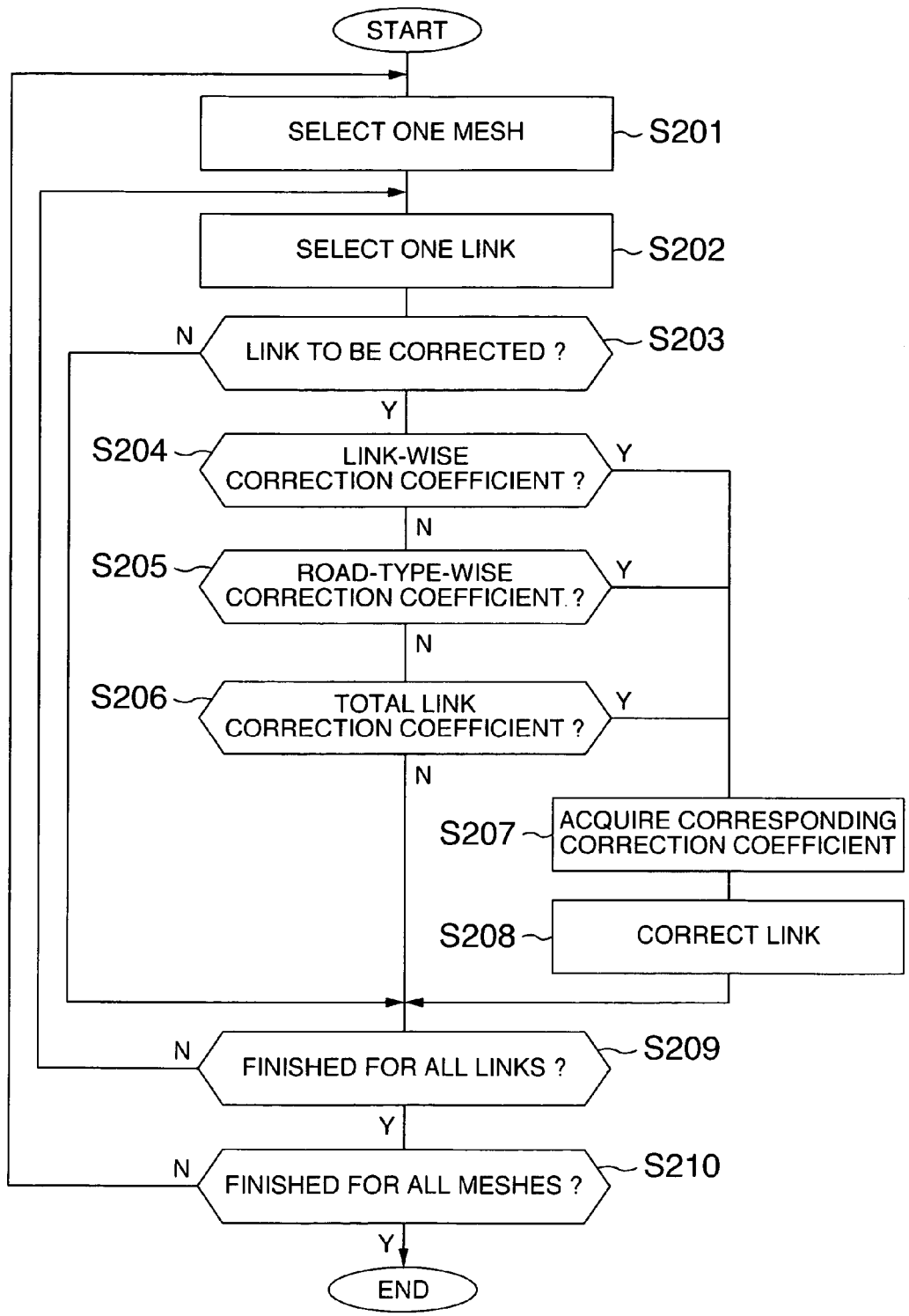
FIG. 9 is a flowchart showing the process of generating the corrected data.

FIG. 9 is a flowchart showing the flow of the process of generating the corrected data.

The data correcting unit 112 selects one mesh on the map (201). Further, one link (referred to as "the object links") is selected from the selected mesh (referred to as "the object mesh") (S202).

The data correcting unit 112 determines whether the object link is the link to be corrected or not. Specifically, the data correcting unit 112 determines whether the link ID of the object link is contained in the teacher data 410 or not, and in the case where such link ID is so contained, determines that the link is not the link to be corrected. In the case where such link ID is not contained, on the other hand, it is determined that the object link is the link to be corrected (S203).

In the case where the object link is not the one to be corrected (NO in step S203), the data correcting unit 112 proceeds to step S209 described later.

In the case where the object link is the one to be corrected (YES in step S203), on the other hand, the data correcting unit 112 determines whether the link-wise correction coefficient 505 is available for the particular link or not. Specifically, the data correcting unit 112 extracts the data in which the mesh ID 501 is the one for the object mesh, from the correction coefficient information 530, and determines whether the link-wise correction coefficient information 505 of the particular data contains the correction coefficient 507 for which the link ID 506 is that of the object link.

In the case where the link-wise correction coefficient so exists (YES in step S204), the data correction unit 112 acquires the particular link-wise correction coefficient 507 (S207).

Then, the object data 420 of the object link is corrected by the link-wise correction coefficient 507 acquired thereby to obtain the corrected data (S208). Specifically, the link travel time 424 in the object data 420 for which the mesh ID 421 is that of the object mesh and the link ID 422 is that of the object link is corrected by the acquired link-wise correction coefficient acquired thereby to obtain the corrected data.

According to the formula described above, the corrected data is given as $a \cdot T_{obj} + b$, where $T_{obj}$ is the link travel time in the object data.

In the absence of the link-wise correction coefficient (NO in step S204), on the other hand, the data correcting unit 112 specifies the road type associated with the object link by accessing the map data. Further, with reference to the correction coefficient information 530, the data correcting unit 112 extracts the data in which the mesh ID 501 is that of the object mesh, and determines whether the particular data contains the road-type-wise correction coefficient 510 for the road type associated with the object link or not (S205). In the presence of the road-type-wise correction coefficient 510 (YES in step S205), the particular road-type-wise correction coefficient 510 is acquired (S207). Further, the object data 420 of the object link is corrected by the acquired road-type-wise correction coefficient thereby to obtain the corrected data (S208). Specifically, the data correcting unit 112 corrects, by the acquired road-type-wise correction coefficient, the link travel time 424 in the object data 420 for which the mesh ID 421 is that of the object mesh and the link ID 422 is that of the object link, thereby acquiring the corrected data. The calculation formula is described above.

In the absence of the road-type-wise correction coefficient (NO in step S205), on the other hand, the data correcting unit 112 determines whether the total link correction coefficient 511 is contained in the data of the correction coefficient information 530 in which the mesh ID 501 is that of the object mesh (S206). In the case where the total link correction coefficient 511 is so contained (YES in step S206), the particular total link correction coefficient 511 is acquired (S207). Then, the object data 420 of the object link is corrected thereby to obtain the corrected data (S208). Specifically, the data correcting unit 112 corrects, by the total link correction coefficient 511, the link travel time 424 of the object data 420 for which the mesh ID 421 is that of the object mesh and the link ID 422 is that of the object link, thereby producing the corrected data. The calculation formula is described above.

In the absence of the total link correction coefficient 511 (NO in step S206), the data correcting unit corrects the link travel time 424 by a predetermined typical correction coefficient (set value) thereby to obtain the corrected data. As an alternative, the correction coefficient applicable to the nation-wide link (nation-wide correction coefficient) is used, if stored.

After correcting the link travel time of the object link in this way, the data correcting unit 112 determines whether the process of S202 to S208 has been finished for all the links in the object mesh (S209). In the case where the process is not finished yet, the control is returned to step S202, in which the link is selected again and the process of steps S202 to S208 is repeated. Once the process is finished for all the links in the object mesh, on the other hand, the data correcting unit 112 selects a new mesh (S201) and executes the process of S202 to S208 for the links in the selected mesh. Upon complete execution of the process for all the meshes (YES in step S210), the process of generating the corrected data is ended.

In this way, the corrected data is accumulated.

Figure 10:
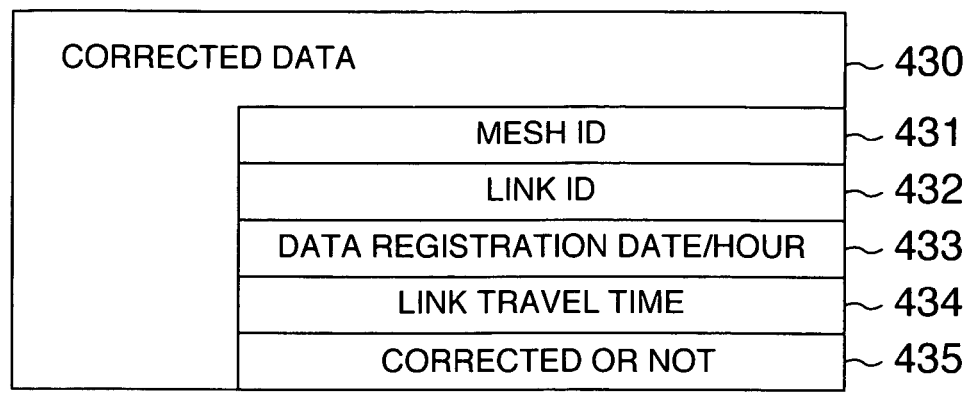
FIG. 10 is a diagram showing an example of the structure of the corrected data.

FIG. 10 shows an example of the structure of the corrected data 430. The corrected data 430 contains, for each mesh ID 431 and each link ID 432, the data registration date/hour 433, the corrected link travel time 434 and the information 435 indicating the complete correction.

Next, the flow of the process of the acquisition to the utilization of the traffic information by the in-vehicle navigation system 300 is explained.

The in-vehicle navigation system 300 gives a traffic information download request to the traffic information distribution server 110, whenever the traffic information is required for route search, in response to the user instruction or periodically. At the same time, the range of downloading (mesh, time zone) is designated.

The information transmitting/receiving unit 113 of the traffic information distribution server 110, upon receipt of the traffic information download request from the in-vehicle navigation system 300, extracts the traffic information corresponding to the range of the request (mesh, time zone) from the teacher data 410 and the corrected data 430, and transmits them to the in-vehicle navigation system 300. The information identifying the teacher data or the corrected data is added to the transmitted traffic information by the information transmitting/receiving unit 113. The traffic information distribution server 100 may alternatively transmit the object data 420 not yet corrected, to the in-vehicle navigation system 300 in response to the request of the in-vehicle navigation system 300.

The in-vehicle navigation system 300 executes various navigation processes such as the traffic information display and route search using the received traffic information.

The route search unit 332 of the in-vehicle navigation system 300, for example, searches for the route of the minimum total travel time to reach the destination using the receiving traffic information. The link travel time, if contained in the teacher data 410, is used as the link travel time for the links making up the route. In the case where the teacher data 410 contains no link travel time, on the other hand, the link travel time 434 in the corrected data 430 is used.

Figure 16:
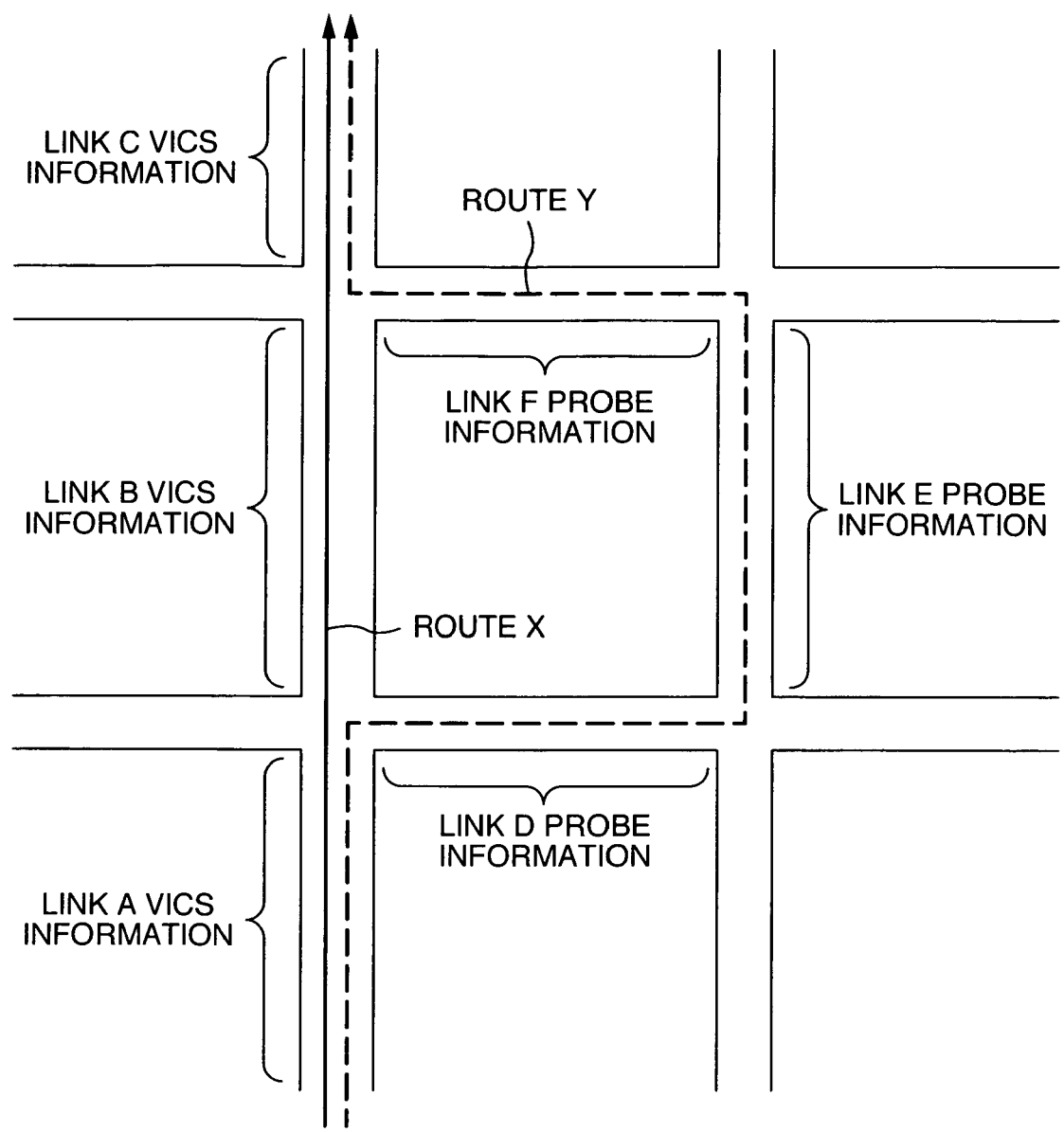
FIG. 16 is a diagram for explaining the problems of the prior art.

As described above, the corrected data 430 is corrected in such a manner as to approach the teacher data 410. Unlike in the prior art shown in FIG. 16, therefore, a frequently curved detour route is not retrieved.

Figure 11:
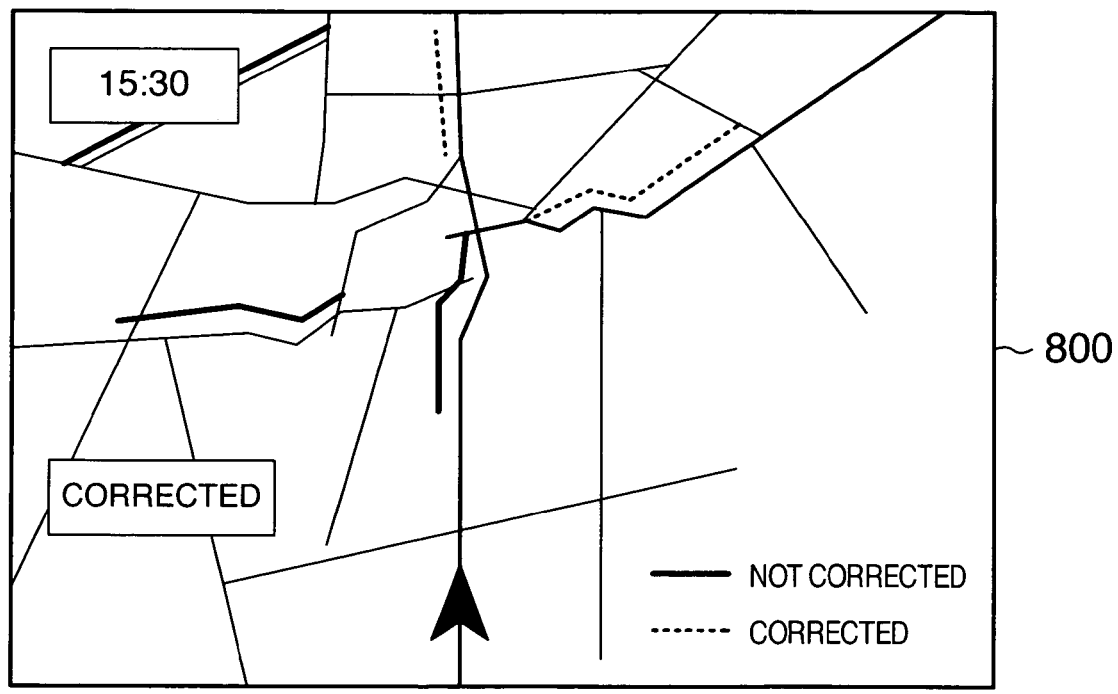
FIG. 11 is a diagram showing an example of display.
Figure 12:
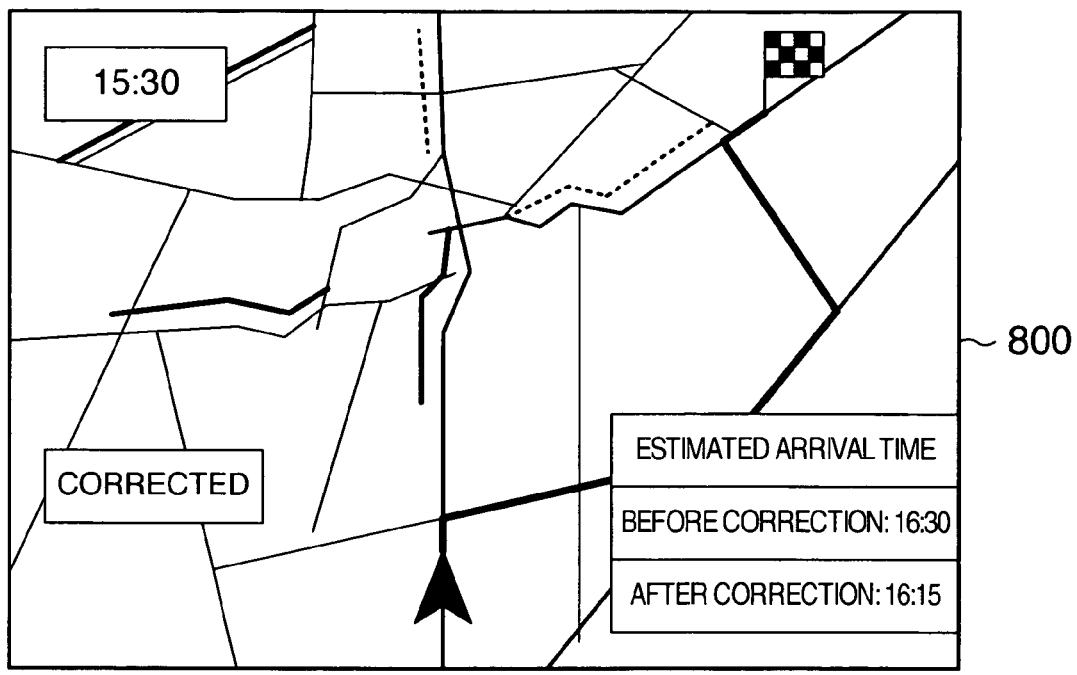
FIG. 12 is a diagram showing an example of display.
Figure 13:
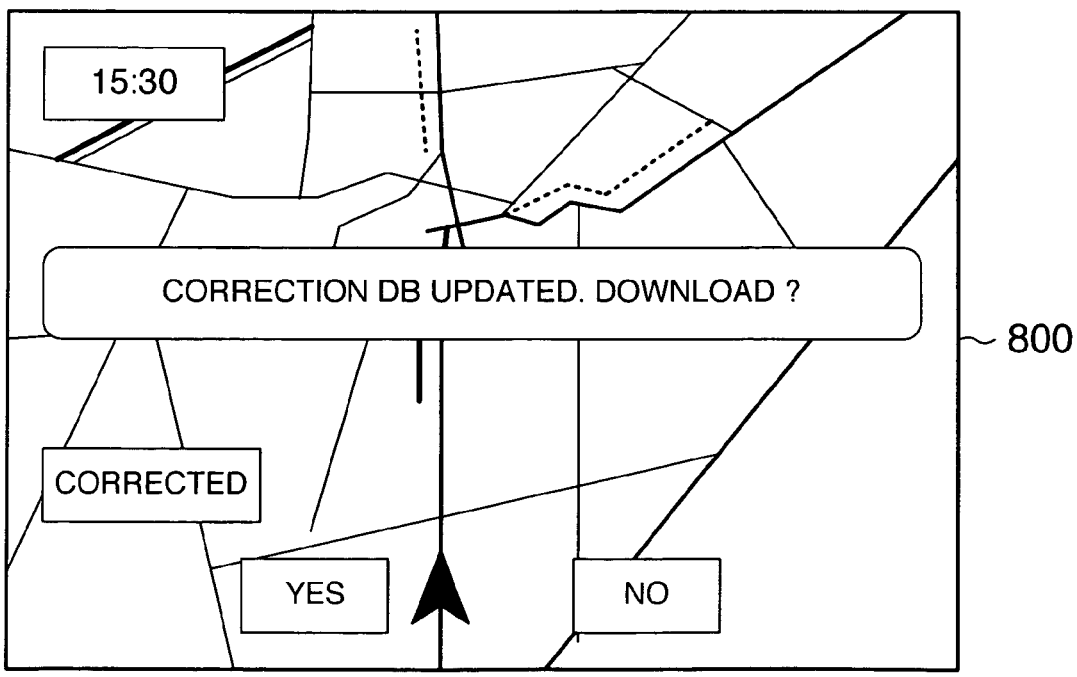
FIG. 13 is a diagram showing an example of display.

FIGS. 11 to 13 show an example of the screen 800 displaying the traffic information.

The traffic information not corrected (teacher data 410, object data 40) and the corrected traffic information (corrected data 430) may be displayed in different forms by the display processing unit 336 of the in-vehicle navigation system 300 as shown in FIG. 11.

Also, as shown in FIG. 12, the result of the route search (retrieved route and estimated arrival time) using the traffic information not corrected (teacher data 410, object data 420) and the result of the route search (retrieved route and estimated arrival time) using the corrected traffic information (corrected data 430) can be displayed in comparison with each other or in different forms by the display processing unit 336.

Also, as shown in FIG. 13, in the case where the corrected data 430 is updated, a message notifying the updating may be output. Specifically, the traffic information distribution server 100 requests the accessing in-vehicle navigation system 300 to notify the data registration date/hour (version information) 433 of the corrected data 430 previously downloaded and held. The communication processing unit 338 of the in-vehicle navigation system 300 transmits, to the traffic information distribution server 100, the data registration date/hour (version information) 433 of the corrected data 430 previously downloaded and held in the receiving information storage unit 339. In the case where the data registration date/hour 433 of the corrected data 430 held by the information receiving unit 113 of the traffic information distribution server 100 is more update than that of the in-vehicle navigation system 300, the information receiving unit 113 notifies the in-vehicle navigation system 300 that the corrected data 430 is updated. In response, the display processing unit 336 of the in-vehicle navigation system 300, as shown in FIG. 13, displays the message notifying that the corrected data is updated, on the display unit 312.

As an alternative, it is determined whether the in-vehicle navigation system 300 has been updated or not, and upon determination that it has been updated, a message notifying the updating is output. Specifically, the traffic information distribution server 100 transmits the data registration date/hour (version information) 433 of the latest corrected data 430 to the in-vehicle navigation system 300 that has accessed thereto. The communication processing unit 338 of the in-vehicle navigation system 300 compares the data registration date/hour (version information) 433 of the corrected data 430 previously downloaded and held in the receiving information storage unit 339 with the latest data registration date/hour received from the traffic information distribution server 100. In the case where the latest data registration date/hour 433 received from the traffic information distribution server 100 is more update than that of the in-vehicle navigation system 300, it is determined that the data has been updated. Then, the display processing unit 336 of the in-vehicle navigation system 300, as shown in FIG. 13, displays a message notifying that the corrected data is updated, on the display unit 312.

Figure 14:
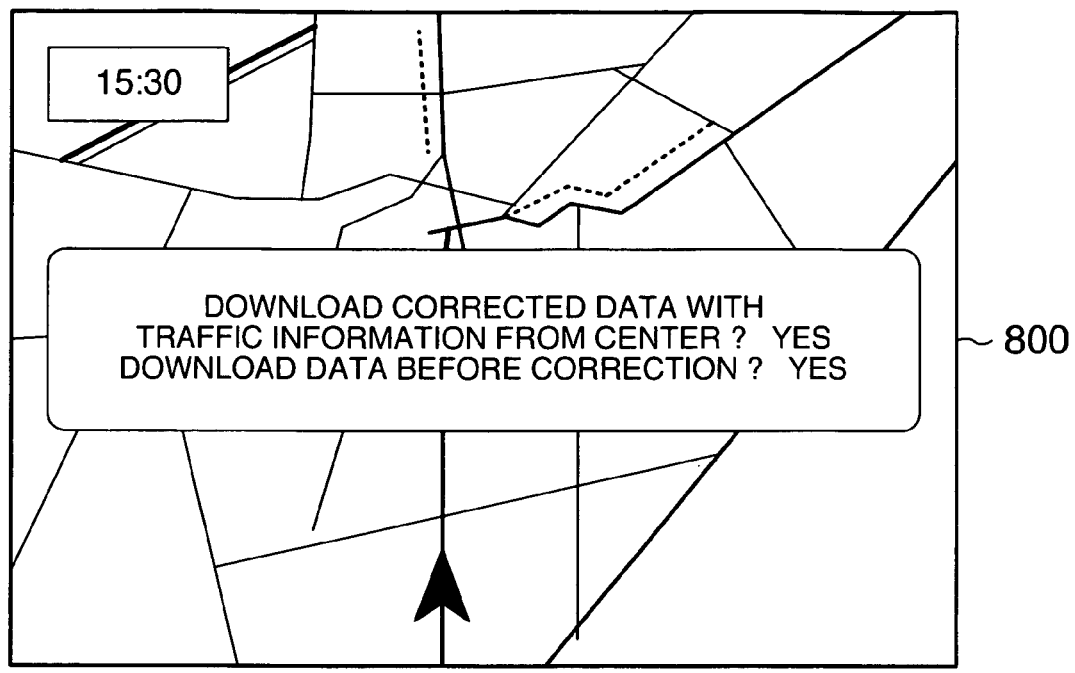
FIG. 14 is a diagram showing an example of display.
Figure 15:
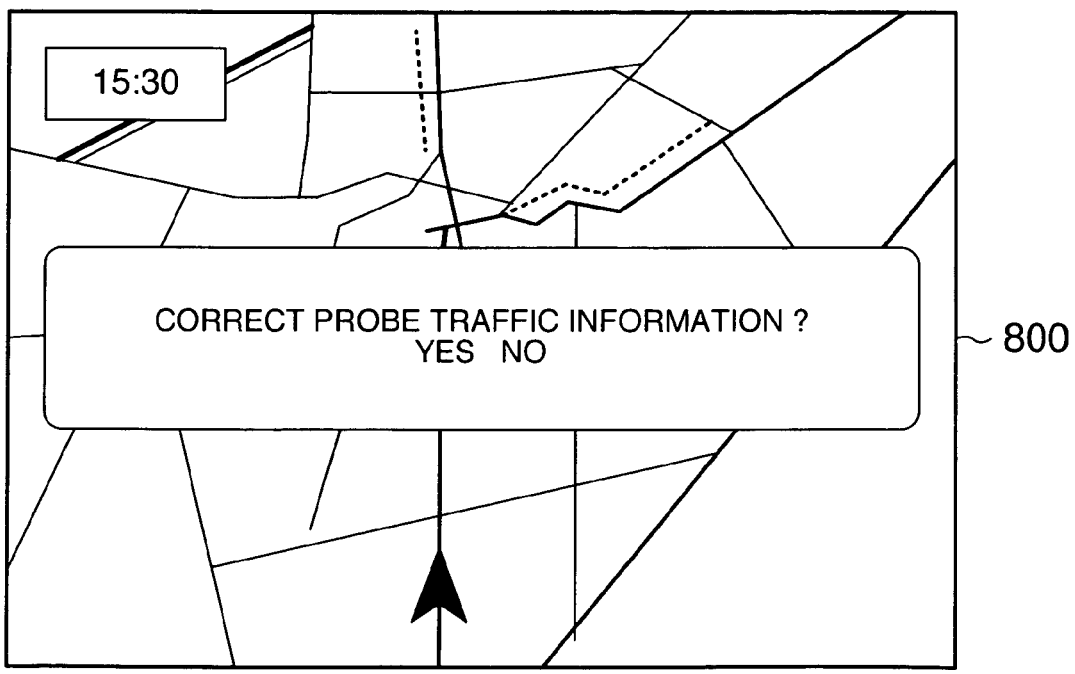
FIG. 15 is a diagram showing an example of display.

Also, the display processing unit 336 may display the screen for receiving the download setting as shown in FIG. 14. For example, the display processing unit 336, when downloading the traffic information, displays the screen for receiving the determination as to whether the traffic information corrected is downloaded or not taking advantage of the opportunity. The communication processing unit 338, upon receipt of such a request, requests the traffic information distribution server 100 to download the corrected traffic information. Alternatively, the display processing unit 336, when downloading the traffic information, may display the screen for receiving the determination as to whether the traffic information not corrected is downloaded or not. The communication processing unit 338, upon receipt of this request, requests the traffic information distribution server 100 to download also the traffic information (teacher data, object data) not corrected.

An embodiment of the invention is explained above.

According to this embodiment, in the case where a plurality of traffic information having different sources are available, a correction coefficient is determined to make one traffic information, as a reference, approach the other information. As for the part lacking the reference traffic information, the other traffic information for the particular part corrected by the correction coefficient is used. In the case where a plurality of traffic information are used at the same time, therefore, the problem which otherwise might be posed by the discrepancy between them can be alleviated.

Also, the correction coefficients are classified into different levels according to the applicability for each link, the applicability for each road type by mesh or the applicability to all the links by mesh. At the time of correction, the application is made exclusively in this order, thus making accurate correction possible.

<Modification 1>

According to the aforementioned embodiments, the correction coefficient converged for each road type or each mesh is determined after determining the link-wise correction coefficient. Nevertheless, the invention is not limited to this method, and the correction coefficient can be determined by converging for each time zone.

The correction coefficients are converged, for example, in the morning time zone (7:00 to 10:00), the daytime zone (11:00 to 13:00), the evening time zone (4:00 to 7:00) and the midnight time zone (11:00 to 3:00). Specifically, the date/hour concerned for determining the correction coefficient is set to 24 hours, and the link-wise correction coefficient 505 for 24 hours is determined at intervals of, say, 5 minutes. The 24 hours are classified into morning, daytime, evening and midnight, and the average value of the link travel time is determined for each class.

In the case where the object data 420 is corrected using the correction coefficients thus determined, the correction coefficient for the time zone (morning, daytime, evening, midnight.) corresponding to the registration date/hour 423 of the object data 420 is used.

The correction coefficients can alternatively be converged (averaged out, for example) by time, date, day of the week, month, season or year. In correcting the object data, the correction coefficient converged by time, the correction coefficient converged by day, the correction coefficient converged by the day of the week, the correction coefficient converged by month, the correction coefficient converged by season and the correction coefficient converged by year are arranged in the order of availability, and the correction coefficient at the top priority is exclusively used.

The correction coefficients can alternatively be converged in accordance with the traffic congestion level. The link travel speed for each link ID is determined, for example, by dividing the link length by the link travel time (using either the teacher data or the object data) for each link. Then, the link-wise correction coefficients are classified according to the link travel speed. The congestion level is classified, for example, into "high congestion" for the speed of 0 to 10 km/h, "congestion" for the speed of 10 to 30 km/h, and "smooth" for the speed of 40 km/h or higher, and the level to which the link travel speed belongs is determined. Then, the average value of the link-wise correction coefficients is determined for each level. In the case where the link travel time of the object data is corrected using the correction coefficient thus determined, a particular congestion level associated with the link travel speed determined from the link travel time is determined, so that the correction coefficient of the particular congestion level thus determined is used. As an alternative, the link-wise correction coefficient can be acquired by classification according to the congestion trend (upward congestion trend, downward congestion trend, no congestion change). For example, "upward congestion trend" is preset to 0 to 10 km/h, "downward congestion trend" to 0 to 10 km and "no congestion change" to 40 km/h or more. Then, the link-wise correction coefficients are classified according to a particular congestion trend class associated with the link travel speed, and by averaging them, a correction coefficient is determined.

<Modification 2>

The explanation is given above about a case in which the traffic information distribution server 100 generates a correction coefficient, and then generates the corrected data using the correction coefficient thus generated. Nevertheless, the invention is not limited to this method, and the traffic information distribution server 100 may transmit the generated correction coefficient to the in-vehicle navigation system 300, which in turn may generate the corrected data using the correction coefficient received from the traffic information distribution server 100.

In such a case, the traffic information distribution server 100 transmits the teacher data 410, the object data 420 and the correction coefficient information 530 in accordance with the request of the in-vehicle navigation system 300.

The in-vehicle navigation system 300 corrects the received object data 420 using the correction coefficient. The traffic information (link travel time) of the link used for the route search or the like, if not contained in the received teacher data 410, for example, is retrieved from the object data 420, and the traffic information (link travel time) thus retrieved is corrected using the received correction coefficient. The traffic information (link travel time) obtained by correction is used for the route search. The correcting method is described above.

In this case, the display processing unit 336 may display the screen for receiving the determination as to whether the correction is made or not.

Also, the display processing unit 336 may display the screen for receiving the determination as to whether the correction coefficient is downloaded or not at the time of accessing the traffic information distribution server 100.

In the case where the correction coefficient information 530 is updated as shown in FIG. 13, a message notifying the updating may be output. Specifically, the traffic information distribution server 100 requests, from the accessor in-vehicle navigation system 300, the data preparation date/hour (version information) 502 of the correction coefficient information 530 previously downloaded and held. The communication processing unit 338 of the in-vehicle navigation system 300 transmits, to the traffic information distribution server 100, the data preparation date/hour (version information) of the correction coefficient information 530 previously downloaded and held. In the case where the data preparation date/hour 502 of the correction coefficient information 530 held by the information receiving unit 113 of the traffic information distribution server 100 is more update than that of the in-vehicle navigation system 300, the information receiving unit 113 of the traffic information distribution server 100 notifies the in-vehicle navigation system 100 that the updating is made. In response, the display processing unit 336 of the in-vehicle navigation system 300, as shown in FIG. 13, displays, on the display unit 312, a message notifying that the updated correction coefficient information is updated.

As an alternative, the in-vehicle navigation system 300 determines whether the correction coefficient information is updated or not and upon determination that it has been updated, outputs a message notifying the updating. Specifically, the traffic information distribution server 100 transmits the data preparation date/hour (version information) of the latest correction coefficient information 530 to the accessor in-vehicle navigation system 300. In the communication processing unit 338 of the in-vehicle navigation system 300, the data preparation date/hour (version information) 503 of the correction coefficient information 530 previously downloaded and held in the receiving information storage unit 339 is compared with the latest data preparation date/hour 503 received from the traffic information distribution server 100. In the case where the latest data preparation date/hour 503 received from the traffic information distribution server 100 is more update than that of the in-vehicle navigation system 300, the communication processing unit 338 determines that the correction coefficient has been updated. The display processing unit 336 of the in-vehicle navigation system 300, as shown in FIG. 13, displays, on the display unit 312, a message notifying that the correction coefficient information has been updated.

Also, the in-vehicle navigation system 300 may acquire the correction coefficient through a recording medium. For example, the correction coefficient is used by installing it from the recording medium (such as a CD-ROM or a memory card) having the correction coefficient recorded therein.

<Modification 3>

As another alternative, the in-vehicle navigation system 300 may generate the correction coefficient. Specifically, the in-vehicle navigation system 300 acquires the teacher data 410 from the traffic information distribution server 100. The probe traffic information collected by the in-vehicle navigation system 300 is used as the object data 420. The correction coefficient is determined using these two traffic information. The method of determining the correction coefficient is described above.

<Modification 4>

In the embodiments described above, the traffic information collected by the sensors installed on the road are used as teacher data and the traffic information derived from the probe car as object data. Nevertheless, the invention is not limited to this combination.

The setting below, for example, can be employed.

(1) The teacher data is used as the traffic information originated from the probe car. The traffic information collected by the sensors installed along the road is used as object data.

(2) The traffic information originated from the probe car or collected by the sensors installed along the roads is used as the teacher data. The statistical traffic information obtained by statistically processing the previously collected traffic information are used as the object data.

(3) The latest version of the statistic traffic information is used as the teacher data, and the old version of the statistical traffic information as the object data.

The application of the invention to the in-vehicle navigation system was described above. This invention, however, is also applicable to the navigation systems other than the in-vehicle navigation system with equal effect.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A traffic information processing apparatus comprising:
a unit that acquires first traffic information for a navigation process and second traffic information originated by a different source from the first traffic information;
a correcting information generating means for extracting traffic information on a first kind of object, data of which is included in both the first traffic information and the second traffic information, from both the first traffic information and the second traffic information during a predetermined time zone within a predetermined number of days, and for generating correcting information used to correct the second traffic information based on the difference between the traffic information extracted from the first and second traffic information; and
a traffic information correcting means for acquiring traffic information on a second kind of object, data of which is not contained in the first traffic information, by correcting the second traffic information on the second kind of object using the correcting information generated by the correcting information generating means,
wherein both of the first kind of object and the second kind of object include at least one link, and the correcting information is generated according to the at least one link;
wherein the correcting information generating means generates the link-wise correcting information to be used with each link making a road on the map, the road-type-wise correcting information to be used in accordance with the road type associated with the link and the mesh-wise correcting information to be used in accordance with the mesh constituting an area defined on the map; and wherein the traffic information correcting means uses the link-wise correcting information, if available, for the link to be corrected, the road-type-wise correcting information, if available, for the road type associated with the link to be corrected, in the absence of the link-wise correcting information for the link to be corrected, and the mesh-wise correcting information, if available, of the mesh associated with the link to be corrected, in the absence of both the link-wise correcting information for the link to be corrected and the road-type-wise correcting information of the road type associated with the link to be corrected.

2. The traffic information processing apparatus according to claim 1,
wherein the correcting information are collected in any one of the categories including hour, date, day of the week, month, season and year, and
wherein the traffic information correcting means exclusively uses the correcting information collected by hour, the correcting information collected by date, the correcting information collected by the day of the week, the correcting information collected by month, the correcting information collected by season and the correcting information collected by year in that order of priority.

3. The traffic information processing apparatus according to claim 1,
wherein the correcting information are collected by traffic condition, and
wherein the correcting information corresponding to the traffic condition of the object to be corrected is used.

4. A traffic information processing apparatus comprising:
a unit that acquires first traffic information for a navigation process and second traffic information originated by a different source from the first traffic information;
a correcting information acquisition means for correcting a difference between the second traffic information and the first traffic information and acquiring correcting information for approximating the second traffic information to a value of the first traffic information;
an object setting means for setting an object requiring correction, wherein data of the object is included in both the first traffic information and the second traffic information; and
a traffic information correcting means for extracting traffic information on the object set by the object setting means during a predetermined time zone within a predetermined number of days from the second traffic information and correcting the extracted traffic information by use of the correcting information,
wherein the object includes at least one link, and the correcting information is generated according to the at least one link;
wherein the correcting information generating means generates the link-wise correcting information to be used with each link constituting each road on the map, the road-type-wise correcting information to be used in accordance with the road type associated with the link and the mesh-wise correcting information to be used in accordance with the mesh constituting an area defined on the map; and
wherein the traffic information correcting means uses the link-wise correcting information, if available, on the link to be corrected, the road-type-wise correcting information, if available, for the road type associated with the link to be corrected, in the absence of the link-wise correcting information for the link to be corrected, and the mesh-wise correcting information, if available, of the mesh associated with the link to be corrected, in the absence of both the link-wise correcting information for the link to be corrected the road-type-wise correcting information of the road type associated with the link to be corrected.

5. The traffic information processing apparatus according to claim 4,
wherein the correcting information are collected in any one of the categories including hour, date, day of the week, month, season and year, and
wherein the traffic information correcting means exclusively uses the correcting information collected by hour, the correcting information collected by date, the correcting information collected by the day of the week, the correcting information collected by month, the correcting information collected by season and the correcting information collected by year in that order of priority.

6. A traffic information processing apparatus according to claim 4,
wherein the correcting information are collected by traffic condition, and
wherein the correcting information corresponding to the traffic condition of the object to be corrected is used.

* * * * *